US012760692B2

(12) United States Patent
Schuehmacher et al.

(10) Patent No.: US 12,760,692 B2
(45) Date of Patent: Oct. 13, 2026

(54) TWO-STROKE ENGINE ASSEMBLY HAVING A CATALYTIC CONVERTER AND METHOD FOR CONTROLLING SAME

(71) Applicant: BOMBARDIER RECREATIONAL PRODUCTS INC., Valcourt (CA)

(72) Inventors: Bruno Schuehmacher, Richmond (CA); Sebastien Thibault, Sherbrooke (CA); Marc Giguere, Magog (CA); Vincent Gamache, Granby (CA); Luc Champigny, Racine (CA); Claude Fortin, St-Denis-de-Brompton (CA)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 0 days.

(21) Appl. No.: 19/329,915

(22) Filed: Sep. 16, 2025

(65) Prior Publication Data

US 2026/0009364 A1 Jan. 8, 2026

Related U.S. Application Data

(62) Division of application No. 18/714,597, filed as application No. PCT/IB2022/061614 on Nov. 30, 2022, now Pat. No. 12,435,677.

(Continued)

(51) Int. Cl.

*F02D 41/40* (2006.01)
*F02D 13/02* (2006.01)

(Continued)

(52) U.S. Cl.

CPC ......... *F02D 41/40* (2013.01); *F02D 13/0242* (2013.01); *F02D 41/008* (2013.01);

(Continued)

(58) Field of Classification Search

CPC .... F02D 41/00; F02D 41/008; F02D 41/0085; F02D 41/024; F02D 41/1454;

(Continued)

(56) References Cited

U.S. PATENT DOCUMENTS

2001/0029734 A1* 10/2001 Kato ...................... F02B 75/22 60/287
2008/0208433 A1 8/2008 Goodall (Continued)

FOREIGN PATENT DOCUMENTS

EP 0890724 A2 1/1999
GB 2278068 A 11/1994

*Primary Examiner* — Loren C Edwards
(74) *Attorney, Agent, or Firm* — BCF LLP

(57) ABSTRACT

A method for controlling a two-stroke engine assembly having a two-stroke internal combustion engine (ICE) having first and second cylinders; and an exhaust system fluidly. The exhaust system has a tuned pipe and a catalytic converter. The method having the steps of: sensing in the exhaust system, with a lambda sensor, a first combustion air-fuel equivalence ratio (λ) and a second combustion λ, the first and second combustion λ's being subsequent combustion λ's of different ones of the first and second cylinders; determining, by an engine control unit (ECU), a difference between the first and second combustion λ's; and in response to the difference between the first and second combustion λ's being greater than a predetermined λ, modifying an air-fuel ratio in at least one of the first and second cylinders to reduce the difference between the first and second combustion λ's below the predetermined λ.

6 Claims, 10 Drawing Sheets

Related U.S. Application Data

(60) Provisional application No. 63/284,155, filed on Nov. 30, 2021.

(51) Int. Cl.

| | |
|---|---|
| ***F02D 41/00*** | (2006.01) |
| ***F02D 41/02*** | (2006.01) |
| ***F02D 41/14*** | (2006.01) |
| ***F02P 5/15*** | (2006.01) |
| *F02B 75/02* | (2006.01) |

(52) U.S. Cl.
CPC ....... *F02D 41/024* (2013.01); *F02D 41/1454* (2013.01); *F02P 5/1502* (2013.01); *F02B 2075/025* (2013.01); *F02D 2200/0802* (2013.01); *F02D 2400/04* (2013.01)

(58) Field of Classification Search
CPC ............. F02D 41/1455; F02D 41/1456; F02D 41/1475; F02D 41/40; F02D 13/0242; F02D 2200/0802; F02D 2400/04; F02P 5/1502; F02B 2075/025; F01N 2560/025
See application file for complete search history.

(56) References Cited

U.S. PATENT DOCUMENTS

| | | | | |
|---|---|---|---|---|
| 2016/0115879 A1* | 4/2016 | Lehmen | .................. | F02D 37/02<br>701/104 |
| 2021/0040881 A1 | 2/2021 | Masuda et al. | | |

* cited by examiner

TWO-STROKE ENGINE ASSEMBLY HAVING A CATALYTIC CONVERTER AND METHOD FOR CONTROLLING SAME

REFERENCE TO RELATED APPLICATION

The present application is a division of U.S. patent application Ser. No. 18/714,597, filed May 30, 2024, which is a United States National Stage Application of International Patent Application No. PCT/IB2022/061614, filed Nov. 30, 2022, which claims priority to U.S. Provisional Patent Application No. 63/284,155, filed Nov. 30, 2021, the entirety of all of which is incorporated herein by reference.

TECHNICAL FIELD

The present technology relates to two-stroke engine assemblies having catalytic converters and to methods for controlling a two-stroke engine assembly having one or more catalytic converters.

BACKGROUND

Catalytic converters are often used in the exhaust systems of four-stroke internal combustion engines (ICEs) to convert pollutants exhausted from such engines during use to less-toxic exhaust gases.

However, catalytic converters are more rarely used in combinations with two-stroke ICEs. One of the reasons is that exhaust gases emitted from two-stroke ICEs contain more oxygen and unburnt hydrocarbons than those emitted from four-stroke ICEs, which can cause the catalytic converter to overheat, become damaged and possibly damage the region surrounding the catalytic converter.

One solution for using a catalytic converter with a two-stroke ICE is to place the catalytic converter as far as possible in the exhaust system from the ICE such that that exhaust gases have cooled before reaching the catalytic converter. However, at low engine speeds, where the exhaust gases emitted by the two-stroke ICE are cooler, the exhaust gases may be too cold when they reach the catalytic converter for the catalytic converter to activate. Indeed, catalytic converters do not operate below a certain temperature, which is sometimes referred to as the light off temperature. Also, in smaller vehicles such as snowmobiles, all-terrain vehicles and motorcycles, it may not be possible to place the catalytic converter far enough in the exhaust system from the ICE as the exhaust system is shorter than in a car for example.

Another solution for using a catalytic converter with a two-stroke ICE is to use a catalytic converter that can resist higher temperatures. However, such catalytic converters tend to be more expensive and tend to have a higher light off temperature. As such, at low engine speeds, the exhaust gases may be too cold when they reach the catalytic converter for such a catalytic converter to activate.

Therefore, there is a desire for a two-stroke engine and exhaust system that can be provided with a catalytic converter and address at least some of the above problems.

Also, for the catalytic converter to operate at maximum efficiency, the air-fuel ratio supplied to the cylinders of the ICE should be kept slightly above stochiometric ratio (i.e. lean mixture). For a gasoline engine, the stochiometric ratio is 14.7:1. However, although the ICE is being controlled for obtaining the ideal ratio for ICE performance or for fuel economy (or another desired air-fuel ratio depending on the operating conditions), in reality, the resulting air-fuel ratio could be off for various reasons. Providing a lambda sensor, also known as an oxygen sensor, in the exhaust system allows the determination of the actual air-fuel ratio. In single-cylinder engines, correcting the air-fuel ratio is a simple matter of adjusting the air-fuel ratio of the single cylinder. However, in multi-cylinder engines it can be difficult to determine which of the cylinder(s) has/have an air-fuel ratio that is too rich or too lean.

One solution consists in providing a lambda sensor at the exhaust port of each cylinder. Therefore, the cylinder or cylinders having the air-fuel ratio that is off from the desired air-fuel ratio can easily identified and corrections can be made. However, multiple lambda sensors add cost, weight, and complexity.

Another solution consists in adjusting the air-fuel ratio in the various cylinders with trial and error until the average air-fuel ratio determined from the signal of the lambda sensor corresponds to the desired air-fuel ratio. However, with such a method, it can take long to find the correction that leads to the desired air-fuel ratio. Also, using such a solution, although the average air-fuel ratio determined from the signal of the lambda sensor corresponds to the desired air-fuel ratio, the engine may not be operating efficiently. For example, in a two-cylinder ICE where the air-fuel ratio in the first cylinder is too rich and the air-fuel ratio in the second cylinder is correct, the correct adjustment is to increase the air-fuel ratio in the first cylinder such that the first cylinder also has the desired air-fuel ratio. However, increasing the air-fuel ratio in the second cylinder instead such that the air-fuel ratio in the second cylinder is leaner than the desired air-fuel ratio also leads to the average air-fuel ratio determined from the signal of the lambda sensor to correspond to the desired air-fuel ratio. As would be understood, in this case, although the average air-fuel ratio determined from the signal of the lambda sensor corresponds to the desired air-fuel ratio, the ICE is not operating efficiently, and the torque generated by the ICE would vary as both cylinders have different air-fuel ratios.

Therefore, there is a desire for a method of controlling an ICE where the air-fuel ratio in the cylinders can be adjusted to obtain a desired air-fuel ratio that addresses at least some of the above problems.

SUMMARY

It is an object of the present technology to ameliorate at least some of the inconveniences present in the prior art.

According to one aspect of the present technology, there is provided a method for controlling a two-stroke engine assembly. The two-stroke engine assembly includes a two-stroke internal combustion engine (ICE), and an exhaust system fluidly connected to the ICE. The exhaust system includes a tuned pipe and a catalytic converter. The method includes: sensing, with an exhaust gas temperature sensor, a temperature of exhaust gases exiting the catalytic converter; comparing, by an engine control unit (ECU), the sensed temperature of the exhaust gas to an operating temperature range of the catalytic converter; and in response to the sensed exhaust gas temperature being outside the operating temperature range of the catalytic converter, controlling by the ECU of the ICE to bring the temperature of the exhaust gases within the operating temperature range of the catalytic converter.

In some embodiments, controlling the ICE to bring the temperature of the exhaust gases within the operating temperature range of the catalytic converter includes at least one of: modifying ignition timing; modifying fuel injection timing; modifying an amount of fuel injected; modifying a throttle valve position; and modifying an exhaust valve position.

In some embodiments, in response to the sensed exhaust gas temperature being below a minimum operating temperature of the catalytic converter, the ECU controlling the ICE to increase the temperature of the exhaust gases.

In some embodiments, controlling the ICE to increase the temperature of the exhaust gases includes modifying at least one of a supply of air to the ICE and a supply of fuel to the ICE to increase an air-fuel ratio.

In some embodiments, in response to the sensed exhaust gas temperature being above a maximum operating temperature of the catalytic converter, the ECU controlling the ICE to decrease the temperature of the exhaust gases.

In some embodiments, controlling the ICE to decrease the temperature of the exhaust gases includes modifying at least one of a supply of air to the ICE and a supply of fuel to the ICE to decrease an air-fuel ratio.

In some embodiments, the catalytic converter is disposed in the tuned pipe. Sensing the temperature of exhaust includes sensing the temperature of the exhaust gases in the tuned pipe.

In some embodiments, the catalytic converter is disposed in a converging portion of the tuned pipe. Sensing the temperature of the exhaust gases in the tuned pipe includes sensing the temperature of the exhaust gases in the converging portion of the tuned pipe.

In some embodiments, the catalytic converter is disposed in a diverging portion of the tuned pipe. Sensing the temperature of the exhaust gases in the tuned pipe includes sensing the temperature of the exhaust gases in the diverging portion of the tuned pipe.

According to another aspect of the present technology, there is provided a two-stroke engine assembly including: a two-stroke internal combustion engine (ICE), and an exhaust system fluidly connected to the ICE. The exhaust system has: a tuned pipe fluidly connected to the ICE; a first catalytic converter fluidly connected to the tuned pipe; a second catalytic converter; a bypass passage fluidly connecting the tuned pipe to the second catalytic converter; a valve for opening and closing the bypass passage; and a temperature sensor for sensing one of: a temperature of the first catalytic converter; and a temperature of exhaust gases exiting the first catalytic converter. In response to the valve being closed, exhaust gas flowing through the tuned pipe and the first catalytic converter. In response to the valve being opened, at least a portion of exhaust gas flowing from the tuned pipe, through the bypass passage, and through the second catalytic converter thereby bypassing the first catalytic converter. An electronic control unit (ECU) is electronically connected to the ICE for controlling the ICE, the valve for controlling a position of the valve, and the temperature sensor for receiving a temperature signal indicative of a temperature of the first catalytic converter. In response to the temperature signal being indicative of the temperature of the first catalytic converter being above a predetermined temperature, the ECU controlling the valve to be opened.

In some embodiments, in response to the valve being closed, all exhaust gas flows through the tuned pipe and the first catalytic converter.

In some embodiments, the first catalytic converter is disposed inside the tuned pipe.

In some embodiments, the first catalytic converter is disposed inside a converging portion of the tuned pipe.

In some embodiments, the second catalytic converter is disposed downstream of the first catalytic converter. An exhaust pipe fluidly connects the first catalytic converter to the second catalytic converter. The bypass passage is fluidly connected to the exhaust pipe. In response to the valve being closed, exhaust gas flows through the tuned pipe, the first catalytic converter and the second catalytic converter.

In some embodiments, the bypass passage is first bypass passage; the valve is a first valve; the temperature sensor is a first temperature sensor; the temperature signal is a first temperature signal; and the predetermined temperature is a first predetermined temperature. The exhaust system also includes: a second bypass passage fluidly connected to the tuned pipe; a second valve for opening and closing the second bypass passage; and a second temperature sensor for sensing one of: a temperature of the second catalytic converter; and a temperature of exhaust gases exiting the second catalytic converter. In response to the first and second valves being closed, exhaust gas flowing through the tuned pipe and the first catalytic converter. In response to the first valve being opened and the second valve being closed, at least a portion of exhaust gas flowing from the tuned pipe, through the first bypass passage, and through the second catalytic converter thereby bypassing the first catalytic converter. In response to the second valve being opened, at least a portion of exhaust gas flowing from the tuned pipe and through the second bypass passage, thereby bypassing the first and second catalytic converters. The ECU is electronically connected to the second valve for controlling a position of the second valve, and the second temperature sensor for receiving a second temperature signal indicative of a temperature of the second catalytic converter. In response to the second temperature signal being indicative of the temperature of the second catalytic converter being above a second predetermined temperature, the ECU controlling the second valve to be opened.

In some embodiments, the second bypass passage is fluidly connected to the first bypass passage downstream of the first valve. In response to the first and second valves being opened, at least a portion of exhaust gas flowing from the tuned pipe, through the first bypass passage and through the second bypass passage, thereby bypassing the first and second catalytic converters.

In some embodiments, a muffler is fluidly connected to the first and second catalytic converters and the bypass passage for receiving exhaust gas from the first and second catalytic converters and the bypass passage.

In some embodiments, a ratio of an engine displacement of the ICE to a volume of the first catalytic converter is in a range of 4 to 8; and a ratio of the engine displacement of the ICE to a volume of the second catalytic converter is in a range of 4 to 8.

According to another aspect of the present technology, there is provided a method for controlling a two-stroke engine assembly. The two-stroke engine assembly included a two-stroke internal combustion engine (ICE), and an exhaust system fluidly connected to the ICE. The exhaust system includes a tuned pipe, a first catalytic converter, a second catalytic converter, a bypass passage fluidly connecting the tuned pipe to the second catalytic converter, and a valve for opening and closing the bypass passage. The method includes: sensing, with a temperature sensor, one of: a temperature of the first catalytic converter, and a temperature of exhaust gases exiting the first catalytic converter; comparing, by an engine control unit (ECU), the sensed temperature to a predetermined temperature; and in response to the temperature sensed by the temperature sensor being above the predetermined temperature, the ECU controlling the valve to be opened such that at least a portion of exhaust gas flowing in the tuned pipe flows through the bypass passage, and through the second catalytic converter thereby bypassing the first catalytic converter.

In some embodiments, the bypass passage is first bypass passage; the valve is a first valve; the temperature sensor is a first temperature sensor; and the predetermined temperature is a first predetermined temperature. The exhaust system also includes: a second bypass passage fluidly connected to the tuned pipe; and a second valve for opening and closing the second bypass passage. The method also includes: sensing, with a second temperature sensor, one of: a temperature of the second catalytic converter, and a temperature of exhaust gases exiting the second catalytic converter; comparing, by the ECU, the sensed temperature to a second predetermined temperature; and in response to the temperature sensed by the second temperature sensor being above the second predetermined temperature, the ECU controlling the second valve to be opened such that at least a portion of exhaust gas flowing in the tuned pipe flows through the second bypass passage thereby bypassing the first and second catalytic converters.

According to another aspect of the present technology, there is provided a method for controlling a two-stroke engine assembly. The two-stroke engine assembly includes a two-stroke internal combustion engine (ICE) having first and second cylinders, and an exhaust system fluidly connected to the ICE. The exhaust system includes a tuned pipe and a catalytic converter. The method includes: sensing in the exhaust system, with a lambda sensor, a first combustion air-fuel equivalence ratio (λ) and a second combustion λ, the first combustion λ and the second combustion λ being subsequent combustion λ's of different ones of the first and second cylinders; determining, by an engine control unit (ECU), a difference between the first combustion λ and the second combustion λ; and in response to the difference between the first combustion λ and the second combustion λ being greater than a predetermined λ, modifying an air-fuel ratio in at least one of the first and second cylinders to reduce the difference between the first combustion λ and the second combustion λ below the predetermined λ.

In some embodiments, the predetermined λ is a first predetermined λ. In response to the difference between the first combustion λ and the second combustion λ being less than the first predetermined λ: sensing with the lambda sensor a current λ in the exhaust system over a first period of time; determining, by the ECU, a difference between an average value X of the current λ over the first period of time to a desired λ; and in response to the difference between the average value X and the desired λ being greater than a second predetermined λ, modifying the air-fuel ratio in both of the first and second cylinders to reduce the difference between the average value X and the desired λ.

In some embodiments, the desired λ corresponds to a λ for operating the catalytic converter of the exhaust system.

In some embodiments, modifying the air-fuel ratio in at least one of the first and second cylinders to reduce the difference between the first combustion λ and the second combustion λ below the predetermined λ includes: modifying the air-fuel ratio in the first cylinder; sensing with the lambda sensor the first combustion λ and the second combustion λ after modifying the air-fuel ratio in the first cylinder; and determining, by the ECU, the difference between the first combustion λ and the second combustion λ after modifying the air-fuel ratio in the first cylinder. In response to the difference between the first combustion λ and the second combustion λ after modifying the air-fuel ratio in the first cylinder being less than the difference between the first combustion λ and the second combustion λ prior to modifying the air-fuel ratio in the first cylinder: further modifying the air-fuel ratio in the first cylinder until the difference, determined by the ECU, between the first combustion λ and the second combustion λ sensed by the lambda sensor is less than the predetermined λ. In response to the difference between the first combustion λ and the second combustion λ after modifying the air-fuel ratio in the first cylinder being greater than the difference between the first combustion λ and the second combustion λ prior to modifying the air-fuel ratio in the first cylinder: modifying the air-fuel ratio in the second cylinder until the difference, determined by the ECU, between the first combustion λ and the second combustion λ sensed by the lambda sensor is less than the predetermined λ.

In some embodiments, modifying the air-fuel ratio in the first cylinder includes decreasing the air-fuel ratio in the first cylinder; and modifying the air-fuel ratio in the second cylinder comprises decreasing the air-fuel ratio in the second cylinder.

In some embodiments, in response to the difference between the first combustion λ and the second combustion λ after modifying the air-fuel ratio in the first cylinder being greater than the difference between the first combustion λ and the second combustion λ prior to modifying the air-fuel ratio in the first cylinder: further modifying the air-fuel ratio in the first cylinder to obtain an air-fuel ratio in the first cylinder corresponding to an air-fuel ratio present in the first cylinder prior to modifying the air-fuel ratio in the first cylinder.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

It must be noted that, as used in this specification and the appended claims, the singular form "a", "an" and "the" include plural referents unless the context clearly dictates otherwise.

For purposes of the present application, terms related to spatial orientation when referring to a vehicle and components in relation to the vehicle, such as "vertical", "horizontal", "forwardly", "rearwardly", "left", "right", "above" and "below", are as they would be understood by a driver of the vehicle sitting thereon in an upright driving position, with the vehicle steered straight-ahead and being at rest on flat, level ground.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
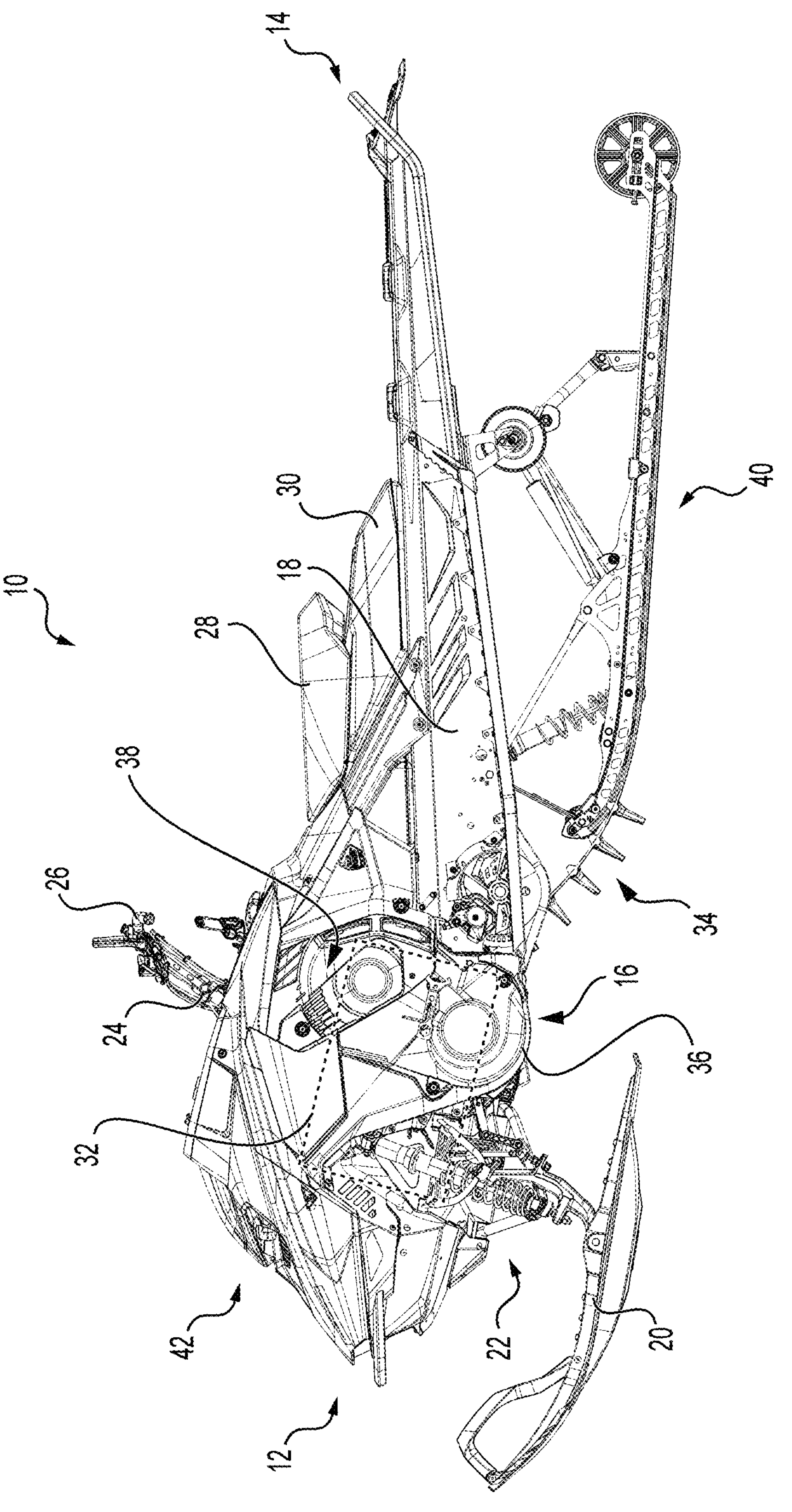
FIG. 1 is a left side elevation view of a snowmobile.

The present disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of “including”, “comprising”, “having”, “containing”, “involving” and variations thereof herein, is meant to encompass the items listed thereafter as well as, optionally, additional items. In the following description, the same numerical references refer to similar elements.

The present technology will be described with reference to a snowmobile 10 having a two-stroke internal combustion engine (ICE) and having a catalytic converter. However, it is contemplated that aspects of the present technology could be used in other types of vehicles having a two-stroke ICE and/or a catalytic converter, such as, but not limited to, an all-terrain vehicle (ATV), a motorcycle, a personal watercraft, an ultralight aircraft, and a boat having an onboard or outboard engine. An example of a marine engine assembly having a two-stroke ICE is provided in U.S. Pat. No. 11,498,653 B1, issued Nov. 15, 2022, the entirety of which is incorporated herein by reference.

With reference to FIG. 1, a snowmobile 10 has a front end 12 and a rear end 14, which are defined consistently with the forward travel direction of the snowmobile 10. The snowmobile 10 has a frame 16, including a tunnel 18, for supporting the various components of the snowmobile 10. The snowmobile 10 has two skis 20 (only a left ski 20 being shown) positioned at the front end 12 of the snowmobile 10 and attached to a front portion of the frame 16 through left and right front suspension assemblies 22 (only a left front suspension assembly 22 being shown). Each of the front suspension assemblies 22 is a double A-arm suspension, but other types of front suspensions are contemplated. A steering column 24 operatively connected to the skis 20. The steering column 24 is attached to a handlebar 26 such that when the handlebar 26 is turned, the skis 20 turn in order to steer the snowmobile 10. A throttle lever (not shown) is provided on the handlebar 26.

A straddle seat 28 is disposed rearward of the handlebar 26. The straddle seat 28 is disposed over a fuel tank 30, which is supported by the tunnel 18. In some embodiments, a passenger seat may be provided behind the straddle seat 28 to accommodate a passenger behind the driver. Left and right footrests 30 (only a left footrest 30 being shown) extend along opposite lateral sides of the tunnel 18 vertically lower than the straddle seat 28 to accommodate the driver’s feet.

As shown schematically in FIG. 1, a two-stroke ICE 32 is supported by the frame 16 and is operatively connected to an endless track 34 (partially illustrated in FIG. 1), as described below, for propelling the snowmobile 10. The ICE 32 is connected to and supported by an engine cradle portion 36 of the frame 16. The ICE 32 is operatively connected to and drives a continuously variable transmission (CVT) 38 (schematically shown in FIG. 1) disposed on a left side of the ICE 32. The CVT 38 is operatively connected to and drives a chain drive (not shown) disposed on a right side of the ICE 32. The chain drive is operatively connected to and drives the endless track 34 via sprockets (not shown). The endless track 34 is supported by a rear suspension assembly 40 disposed under and connected to the tunnel 18. It is contemplated that, in other embodiments, the positions of the CVT 38 and the chain drive could be switched such that the CVT 38 is disposed on the right side of the ICE 32 and the chain drive is disposed on the left side of the ICE 32.

At the front end 12 of the snowmobile 10, fairings 42 are provided that enclose internal components of the snowmobile 10 such as the ICE 32, the CVT 38 and the chain drive, thereby providing an external shell that not only protects these components of the snowmobile 10, but also make the snowmobile 10 more aesthetically pleasing.

The snowmobile 10 includes other elements well known in the art, and as such they will not be described in detail herein.

Figure 2:
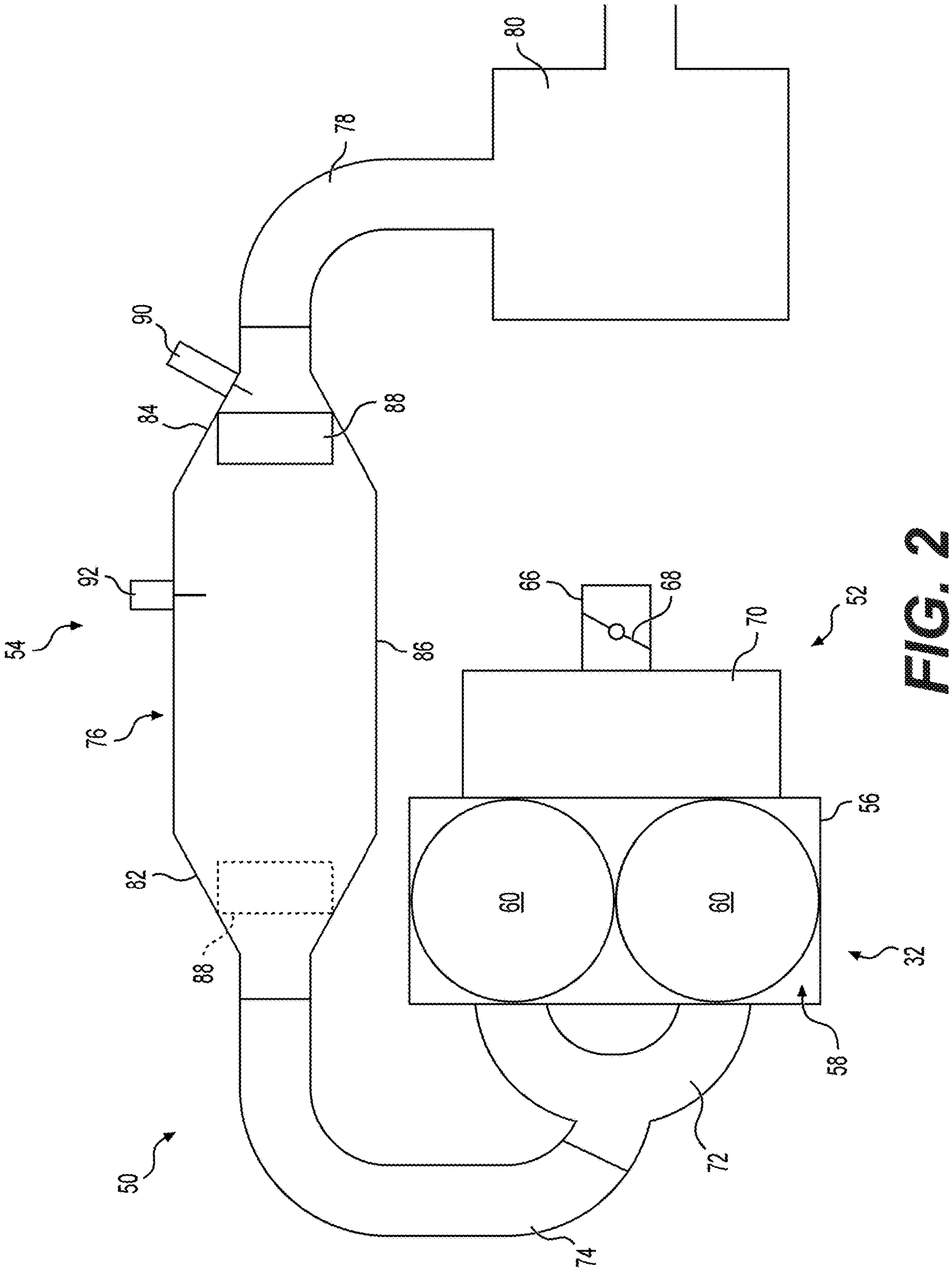
FIG. 2 is a schematic representation of a two-stroke engine assembly of the snowmobile of FIG. 1.

Turning now to FIG. 2, an embodiment of a two-stroke engine assembly 50 of the snowmobile 10 will be described. The two-stroke engine assembly 50 having the ICE 32, an air intake system 52, and an exhaust system 54. As described above, is it contemplated that two-stroke engine assemblies incorporating aspects of the technology of the two-stroke engine assembly 50 could be provided in vehicles other than a snowmobile, such as in a marine engine assembly of a boat.

The ICE 32 has a crankcase 56, a cylinder block 58 defining two cylinders 60 connected on top of the crankcase 56 and a cylinder head (not shown) connected on top of the cylinder block 58. The ICE 32 also has a crankshaft (not shown) disposed in the crankcase 56 and driven by the motion of pistons (not shown) housed in the cylinders 60. It is contemplated that, in other embodiments, the ICE 32 could have only one or more than two cylinders 60. Combustion chambers are defined by the pistons, the cylinders 60 and the cylinder head. Fuel injectors 62 (FIG. 9) inject fuel directly into the combustion chambers. As such, the ICE 32 is a direct-injection two-stroke internal combustion engine. It is contemplated that in other embodiment, the fuel injectors 62 could inject fuel upstream of the combustion chambers. Spark plugs 64 (FIG. 9) mounted to the cylinder head ignite the fuel-air mixture in the combustion chambers.

Figure 9:
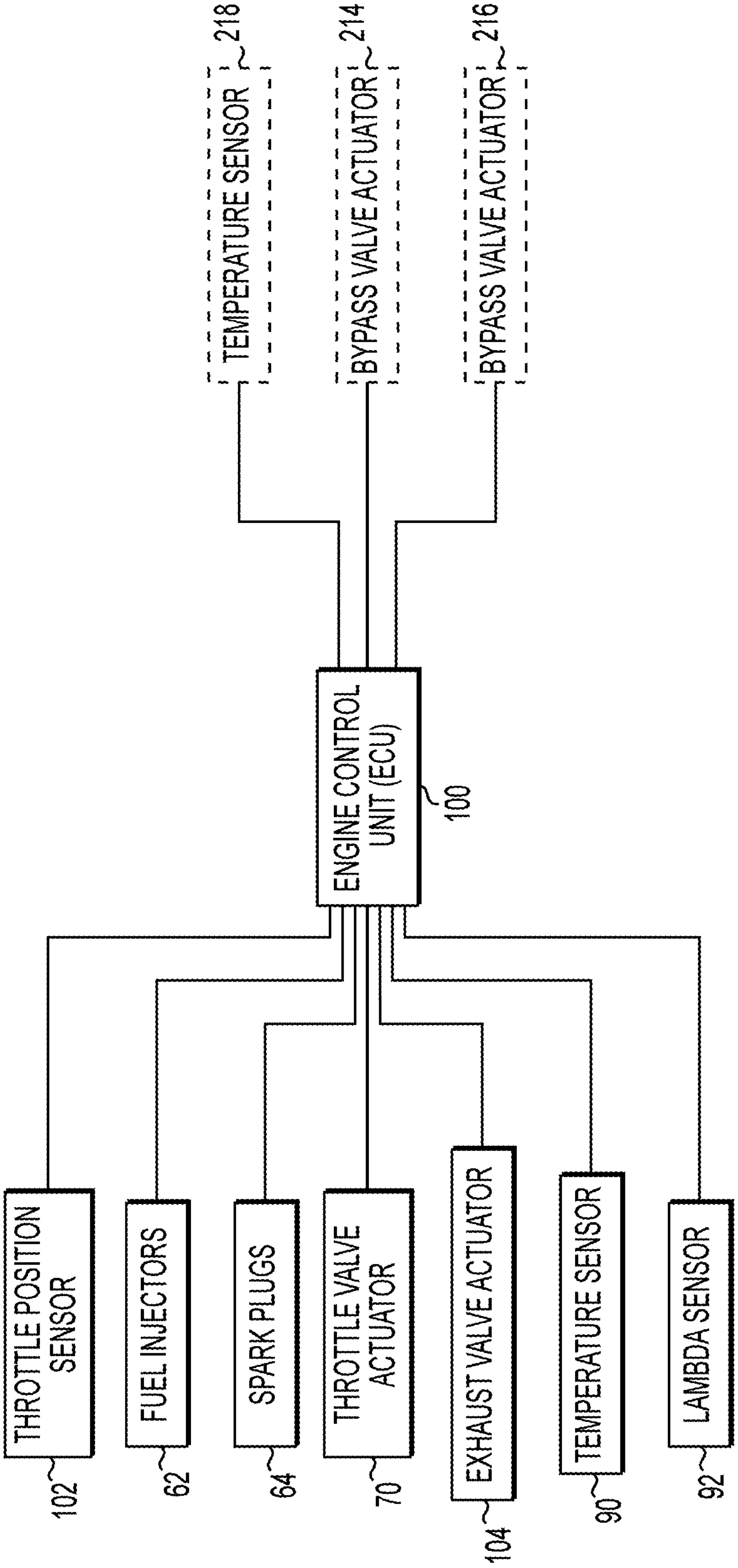
FIG. 9 is a schematic representation of various components of the two-stroke engine assemblies of FIGS. 2 and 4 to 7.

The air intake system 52 has air intake passages (not shown) for delivering air from outside the snowmobile 10 to a throttle body 66. The throttle body 66 contains a throttle valve 68 actuated by a throttle valve actuator 70 (FIG. 9). The throttle valve 68 controls a flow of air to the ICE 32. From the throttle body 66, air flows to an air intake plenum 70, and from the plenum 70 to the combustion chambers of the ICE 32.

The exhaust system 54 has an exhaust manifold 72 that receives exhaust gases from the cylinders 60. An exhaust pipe 74 fluidly connects the exhaust manifold 72 to a tuned pipe 76. An exhaust pipe 78 fluidly connects the tuned pipe 76 to a muffler 80. The tuned pipe 76 has a diverging portion 82 defining an inlet of the tuned pipe 76, a converging portion 84 defining an outlet of the tuned pipe 76, and a central portion 86 having a generally constant diameter disposed between the diverging and converging portions 82, 84. A catalytic converter 88 is disposed in the tuned pipe 80, more specifically in the converging portion 84. It is contemplated that the catalytic converter 88 could alternatively be disposed in the diverging portion 82 of the tuned pipe 76 as shown in dotted lines in FIG. 2. It is contemplated that the catalytic converter 88 could be otherwise fluidly connected to the tuned pipe 76 in other embodiments. When the two-stroke engine assembly 50 is in use, exhaust gases flow from the combustion chambers of the ICE 32 into the exhaust manifold 72, then through the exhaust pipe 74 and the tuned pipe 76, then through the catalytic converter 88 into the exhaust pipe 78 and then the muffler 80, and from the muffler 80 to the atmosphere.

As indicated above, exhaust gases emitted from two-stroke ICEs contain more oxygen and unburnt hydrocarbons than those emitted from four-stroke ICEs. To help prevent overheating of the catalytic converter 88, the volume of the catalytic converter is selected such that the space velocity of the catalytic converter 88 is more than ten times that of a catalytic converter for a four-stroke ICE. The space velocity is equal to the flow rate of exhaust gases through the catalytic converter divided by the volume of the catalytic converter. For example, for a four-stroke ICE operating at wide-open throttle, the catalytic converter would have a space velocity of 200000 $h^{-1}$ (per hour), whereas for an embodiment where the ICE 32 is 850 cubic centimeters (cc) two-stroke engine, with the ICE 32 operating at 8000 revolutions per minute (RPM), the space velocity of the catalytic converter 88 is about 2300000 $h^{-1}$, which is 11.5 times the space velocity of the catalytic converter of the four-stroke engine. For the catalytic converter 88 having a space velocity meeting the requirements of the ICE 32, a ratio R of engine displacement in cc (Y) to the volume of the catalytic converter in cc (V) (i.e. R=Y/V) can be established. For the two-stroke ICE 32 provided in the snowmobile 10, it has been found that this ratio R should be in the range of 4 to 8. More specifically, for a 600 cc to 650 cc ICE 32, the ratio R should be in the range of 4.5 to 5.5 and for a 850 cc to 900 cc ICE, the ratio R should be in the range of 6.5 to 7.5. A similar ratio applies to the catalytic converter 204 described below.

An exhaust gas temperature sensor 90 senses a temperature of exhaust gases exiting the catalytic converter 88 in order to determine a temperature of the catalytic converter 88. In the present embodiment, the temperature sensor 90 senses the temperature of exhaust gases exiting the catalytic converter 88 in the converging portion 84 at a distance of less than 1 centimeter from the catalytic converter 88, but it is contemplated that this distance could be greater in some embodiment, such as less than 30 centimeters for example. It is contemplated in other embodiments, the temperature sensor 90 could sense the temperature of the catalytic converter 88 directly. It is also contemplated that an additional temperature sensor could sense a temperature of exhaust gases entering the catalytic converter 88 in order to determine a difference between the temperature of exhaust gases entering the catalytic converter 88 and the temperature of exhaust gases exiting the catalytic converter 88. In embodiments where the catalytic converter 88 is disposed in the diverging portion 82, the temperature sensor 90 senses the temperature of exhaust gases exiting the catalytic converter 88 in the diverging portion 82. A lambda sensor 92, also known as an oxygen sensor, senses an air-fuel equivalence ratio (λ, hence the name lambda sensor) by determining the proportion of oxygen present in the exhaust gases. The air-fuel equivalence ratio (λ) is a ratio of the actual air-fuel ratio to the stochiometric ratio. A λ of 1.0 corresponds to a stochiometric ratio, a λ of more than 1.0 indicates a lean air-fuel mixture, and a λ of less than 1.0 indicates a rich air-fuel mixture. The lambda sensor 92 senses the λ in central portion 86 of the tuned pipe 76 upstream of the catalytic converter 88. It is contemplated that the lambda sensor 82 could sense the λ at other portions of the exhaust system 54 upstream of the catalytic converter 88.

Turning now to FIG. 9, additional components of the two-stroke engine assembly 50 will be described. An engine control unit (ECU) 100 is provided to receive signals from the temperature sensor 90, the lambda sensors 92 and other sensors described below. The ECU 100 also sends signals to the fuel injectors 62, the spark plugs 64, the throttle valve actuator 70 and other components described below to control operation of these components and, as a result, operation of the ICE 32. A throttle position sensor 102 senses a position of the throttle valve 68 and sends a signal representative of this position to the ECU 100. An exhaust valve actuator 104 receives a signal from the ECU 100 to actuate exhaust valves (not shown) of the ICE 32. It is contemplated that in some embodiments, the exhaust valves and the exhaust valve actuator 104 could be omitted. The ECU 100 also receives signals from other sensors (not shown) provided on the snowmobile 10 such as, but not limited to, a throttle lever position sensor, an intake air temperature sensor and an intake air pressure sensor. It should be noted that the two-stroke engine assembly 50 is not provided with the components shown in dotted-line boxes in FIG. 9.

Figure 3:
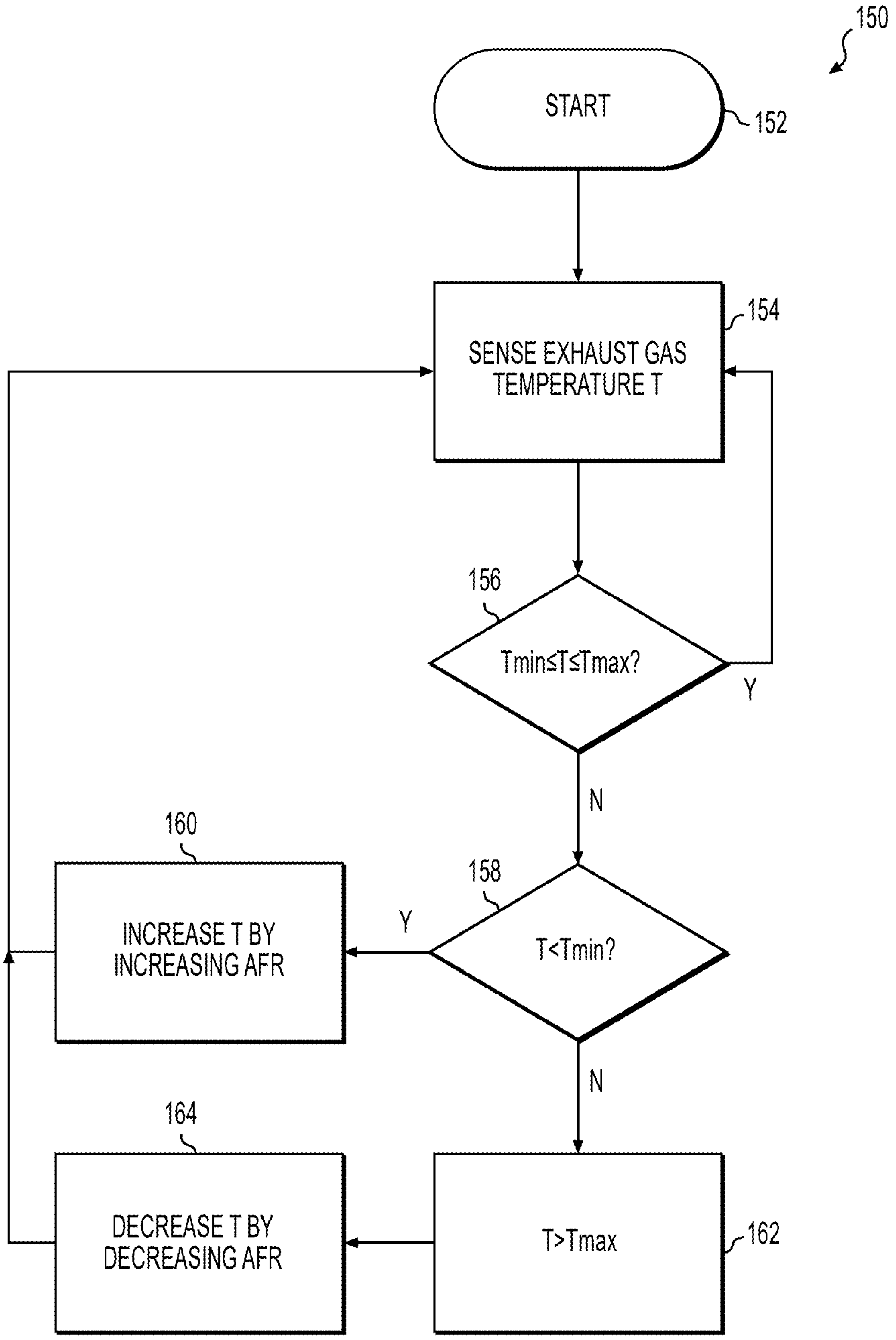
FIG. 3 is a flowchart of a method for controlling the two-stroke engine assembly of FIG. 2.

Turning now to FIG. 3, a method 150 for controlling the two-stroke engine assembly 50 will be described. The method 150 starts at 152 when the ICE 32 is started. Then, at 154, the exhaust gas temperature sensor 90 senses the temperature T of the exhaust gases exiting the catalytic converter 88 and sends a signal representative of this temperature to the ECU 100. Then, at 156, the ECU 100 compares the sensed temperature T of the exhaust gases to an operating temperature range of the catalytic converter 88. The operating temperature range of the catalytic converter 88 is between, and including, a minimum operating temperature Tmin and a maximum operating temperature Tmax. The minimum operating temperature Tmin is the temperature below which the catalytic converter 88 is too cold for the catalytic conversion process to occur, which is also known as the light off temperature. In the present embodiment, the minimum operating temperature Tmin is 400 degrees Celsius. It is contemplated that minimum operating temperature Tmin could be up to 600 degrees Celsius or another temperature depending on the type of catalytic converter 88 being used. The maximum operating temperature Tmax is the temperature above which the catalytic converter 88 is too hot and could become damaged or damage the components in proximity to the catalytic converter 88. In the present embodiment, the maximum operating temperature Tmax is about 800 degrees Celsius). It is contemplated that maximum operating temperature Tmax could be up to about 1000 degrees Celsius or another temperature depending on the type of catalytic converter 88 being used.

If at 156, the temperature T of the exhaust gases is within the operating temperature range of the catalytic converter 88, then the method 150 returns to 154. If at 156, the temperature T of the exhaust gases is outside the operating temperature range of the catalytic converter 88, then the method 150 continues to 158, 160, 162, and 164 as described below, where the ECU 100 will control the ICE 32 to bring the temperature T of the exhaust gases within the operating temperature range of the catalytic converter 88. This can be done by modifying the ignition timing of the spark plugs 64, modifying the fuel injection timing of the fuel injectors 62, modifying an amount of fuel injected by the fuel injectors 62, modifying a throttle valve position by controlling the throttle valve actuator 70 to open or close the throttle valve 68, and/or modifying a position of the exhaust valves by controlling the exhaust valve actuator 104 to open or close the exhaust valves.

If at 156, the temperature T of the exhaust gases is outside the operating temperature range of the catalytic converter 88, then at 158 the ECU 100 determines if the temperature of the exhaust gases T is below the minimum operating temperature Tmin of the catalytic converter 88. This could be the case when the ICE 32 is cold started or has been operating at idle speed or low speed for a certain period of time for example. If at 158, the ECU 100 determines that the temperature of the exhaust gases T is below the minimum operating temperature Tmin of the catalytic converter 88, then at 160 the ECU 100 controls the ICE 32 to increase the temperature T of the exhaust gases. In the present embodiment, this is done by modifying the supply of air and/or the supply of fuel to the ICE 32 in order to increase the air-fuel ratio (AFR), but other control strategies are contemplated. For example, it is contemplated that the ignition timing could be reduced to ignite closer to top dead center (TDC) and/or that the start of injection (SOI) could be done closer to TDC. From 160, the method returns to 154.

If at 158, the temperature T of the exhaust gases is not below the minimum operating temperature Tmin of the catalytic converter 88, then at 162 the ECU 100 determines that the temperature T of the exhaust gases is above the maximum operating temperature Tmax of the catalytic converter 88. This could be the case when the ICE 32 has been operating at maximum speed for a certain period of time for example. Then at 164 the ECU 100 control the ICE 32 to decrease the temperature T of the exhaust gases. In the present embodiment, this is done by modifying the supply of air and/or the supply of fuel to the ICE 32 in order to decrease the air-fuel ratio (AFR), but other control strategies are contemplated. For example, should the temperature T of the exhaust gases be above the maximum operating temperature Tmax for more than a predetermined period of time, the ECU 100 could reduce the temperature T of the exhaust gases by limiting the speed of the ICE 32. For example, it is contemplated that the ignition timing could be increased to ignite further from top dead center (TDC) and/or that the start of injection (SOI) could be done further from TDC. In another example, the ECU 100 could reduce the temperature T of the exhaust gases by stopping to inject fuel and stopping ignition in one of the cylinders 60. From 164, the method returns to 154.

Turning now to FIGS. 4 to 7, alternative embodiments 200, 220, 230 and 240 of the two-stroke engine assembly 50 will now be described. Components of the two-stroke engine assemblies 200, 220, 230 and 240 that are the same as or similar to those of the two-stroke engine assembly 50 have been labeled with the same reference numerals and will not be described again. Components of the two-stroke engine assemblies 200, 220, 230 and 240 that are the same as or similar to those of the other ones of the two-stroke engine assemblies 200, 220, 230 and 240 have been labeled with the same reference numerals and will described in detail only once.

Figure 4:
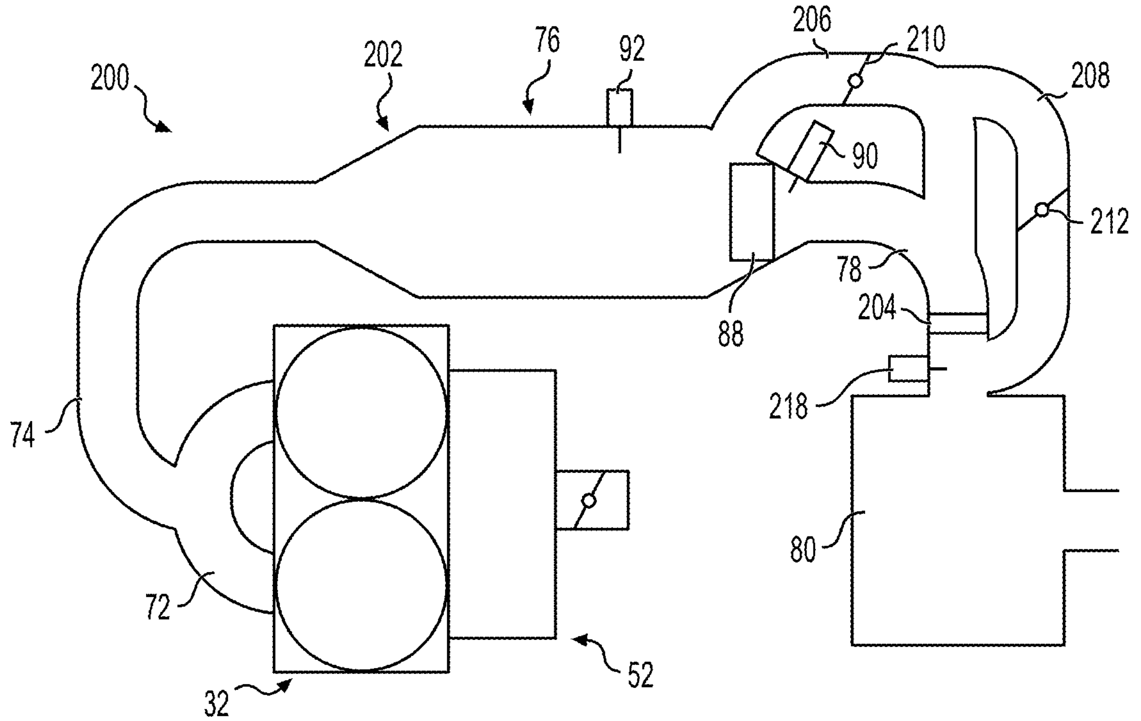
FIG. 4 is a schematic representation of an alternative embodiment of a two-stroke engine assembly of the snowmobile of FIG. 1.

With reference to FIG. 4, the two-stroke engine assembly 200 has an exhaust system 202. In addition to having all the same or similar components as the exhaust system 54 described above, the exhaust system 202 has a second catalytic converter 204, two bypass passages 206, 208, and two bypass valves 210, 212. The bypass valve 210 is disposed in the bypass passage 206. The bypass valve 212 is disposed in the bypass passage 208. The bypass valve 210, 212 are opened and closed by bypass valve actuators 214, 216 respectively (FIG. 9). The bypass valve actuators 214, 216 are controlled by the ECU 100. A second exhaust temperature sensor 218 senses a temperature of exhaust gases exiting the catalytic converter 204 in order to determine a temperature of the catalytic converter 204. In the present embodiment, the temperature sensor 218 senses the temperature of exhaust gases exiting the catalytic converter 204 at a distance of less than 1 centimeter from the catalytic converter 204, but it is contemplated that this distance could be greater in some embodiment, such as less than 30 centimeters for example. It is contemplated in other embodiments, the temperature sensor 218 could sense the temperature of the catalytic converter 204 directly. It is also contemplated that an additional temperature sensor could sense a temperature of exhaust gases entering the catalytic converter 204 in order to determine a difference between the temperature of exhaust gases entering the catalytic converter 204 and the temperature of exhaust gases exiting the catalytic converter 204. The ECU 100 receives signals from the temperature sensor 218.

In the exhaust system 202, the second catalytic converter 204 is disposed in the exhaust pipe 78 downstream of the catalytic converter 88, such that the exhaust pipe 78 fluidly connects the catalytic converter 88 to the catalytic converter 204. The temperature sensor 218 senses the temperature of exhaust gases in the exhaust pipe 78 downstream of the catalytic converter 204. The bypass passage 206 fluidly connects the tuned pipe 76 with the exhaust pipe 78 at a position upstream of the catalytic converter 204. The bypass passage 208 fluidly connects to the bypass passage 206 at a position downstream of the bypass valve 210. The bypass passage 208 fluidly connects the tuned pipe 76 with the exhaust pipe 78 at a position downstream of the catalytic converter 204.

In response to the bypass valve 210 being closed, all exhaust gases flow through the tuned pipe 76 and the catalytic converter 88, then the exhaust pipe 78 and the catalytic converter 204, and then through the muffler 80. In response to the bypass valve 210 being opened and the bypass valve 212 is closed, a portion of exhaust gas flows from the tuned pipe 76, through the bypass passage 206, into the exhaust pipe 78 and through the catalytic converter 204, thereby bypassing the catalytic converter 88. In response to the bypass valves 210, 212 being opened, a portion of exhaust gas flows from the bypass passage 206, through the bypass passage 208 and into the exhaust pipe 78, thereby bypassing the catalytic converter 204.

It is contemplated that in some embodiments, the bypass passage 208, and therefore the bypass valve 212 and the bypass valve actuator 216, could be omitted.

Figure 5:
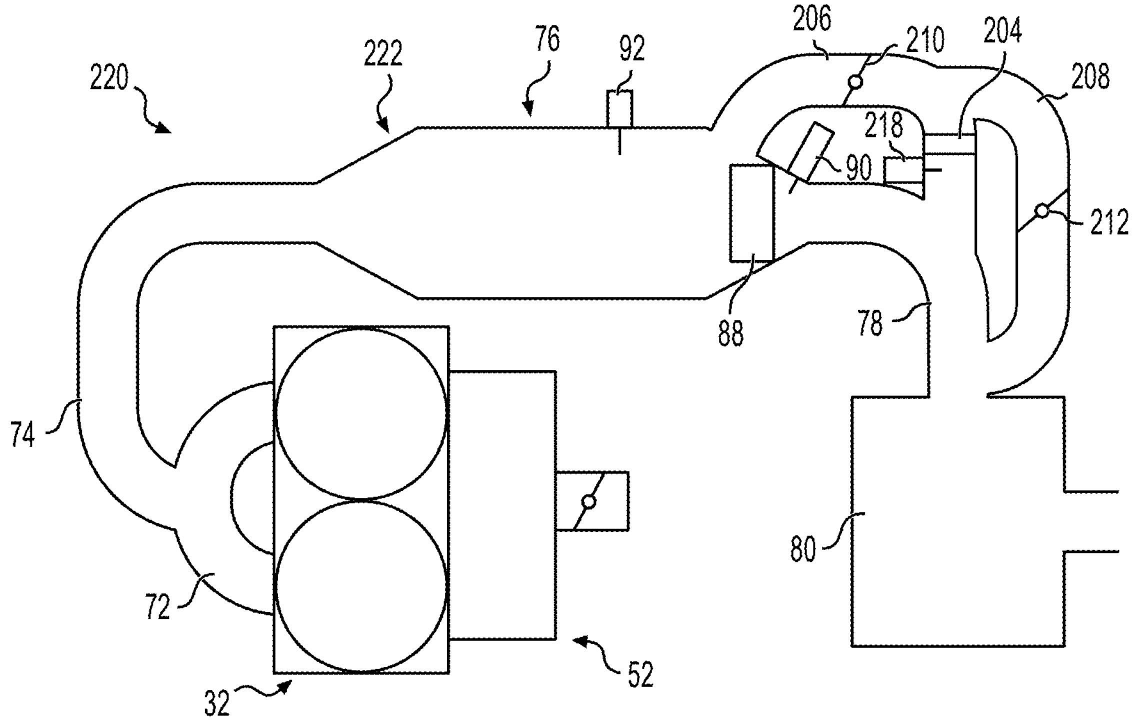
FIG. 5 is a schematic representation of another alternative embodiment of a two-stroke engine assembly of the snowmobile of FIG. 1.

With reference to FIG. 5, the two-stroke engine assembly 220 has an exhaust system 222. The exhaust system 222 differs from the exhaust system 202 described above in that the second catalytic converter 204 is disposed in the bypass passage 206. As such, the temperature sensor 218 senses the temperature of exhaust gases in the bypass passage 206 downstream of the catalytic converter 204. The bypass passage 208 fluidly connects to the bypass passage 206 at a position downstream of the bypass valve 210 and upstream of the catalytic converter 204.

Figure 6:
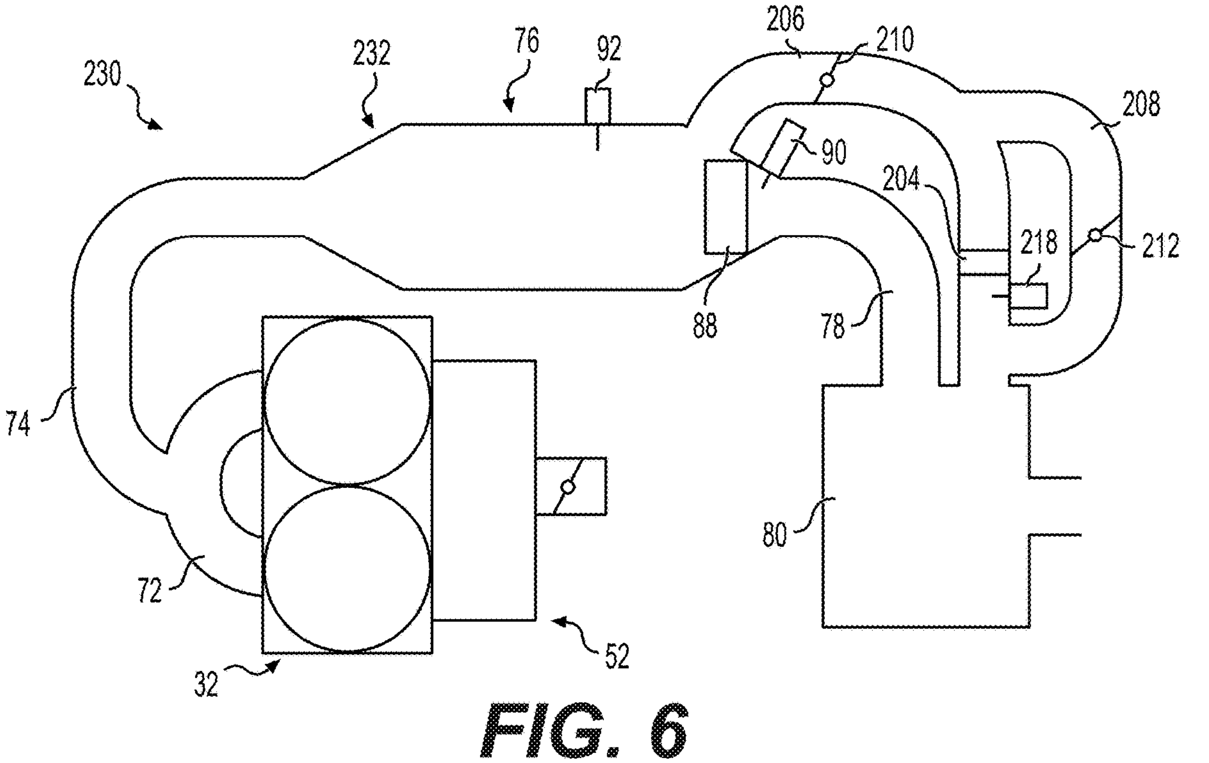
FIG. 6 is a schematic representation of another alternative embodiment of a two-stroke engine assembly of the snowmobile of FIG. 1.

With reference to FIG. 6, the two-stroke engine assembly 230 has an exhaust system 232. The exhaust system 232 differs from the exhaust system 222 described above in that instead of being connected to the exhaust pipe 78, the outlet end of the bypass passage 206 is fluidly connected to the muffler 80 separately from the exhaust pipe 78. Also, the outlet end of the bypass passage 208 is fluidly connected to the bypass passage 206 downstream of the catalytic converter 204. It is contemplated that in an alternative embodiment, the outlet end of the bypass passage 208 could be fluidly connected to the muffler separately from the exhaust pipe 78 and the bypass passage 206.

Figure 7:
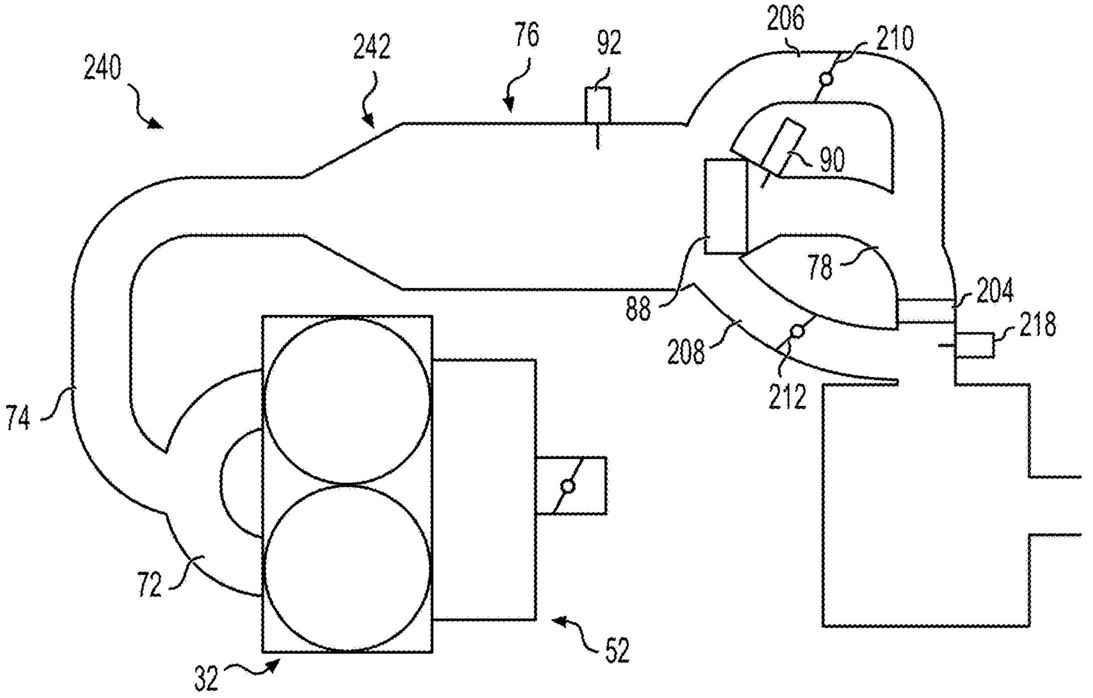
FIG. 7 is a schematic representation of another alternative embodiment of a two-stroke engine assembly of the snowmobile of FIG. 1.

With reference to FIG. 7, the two-stroke engine assembly 240 has an exhaust system 242. The exhaust system 242 differs from the exhaust system 202 described above in that the second bypass passage 208 is fluidly connected between the tuned pipe 208 and the exhaust pipe 78 at a position downstream of the catalytic converter 204. In an alternative embodiment, it is contemplated that the catalytic converter 204 could be disposed in the bypass passage 206 downstream of the bypass valve 210.

In the exhaust systems 202, 222, 232 and 242 for exhaust gas to bypass the catalytic converter 88, the bypass valve 210 is opened and the bypass valve 212 is closed. In the exhaust systems 202, 222 and 232, for exhaust gas to bypass both catalytic converters 88, 204, both bypass valves 210, 212 are opened. However, in the exhaust system 242, for exhaust gas to bypass both catalytic converters 88, 204, the bypass valve 210 is closed and the bypass valve 212 is opened.

Figure 8:
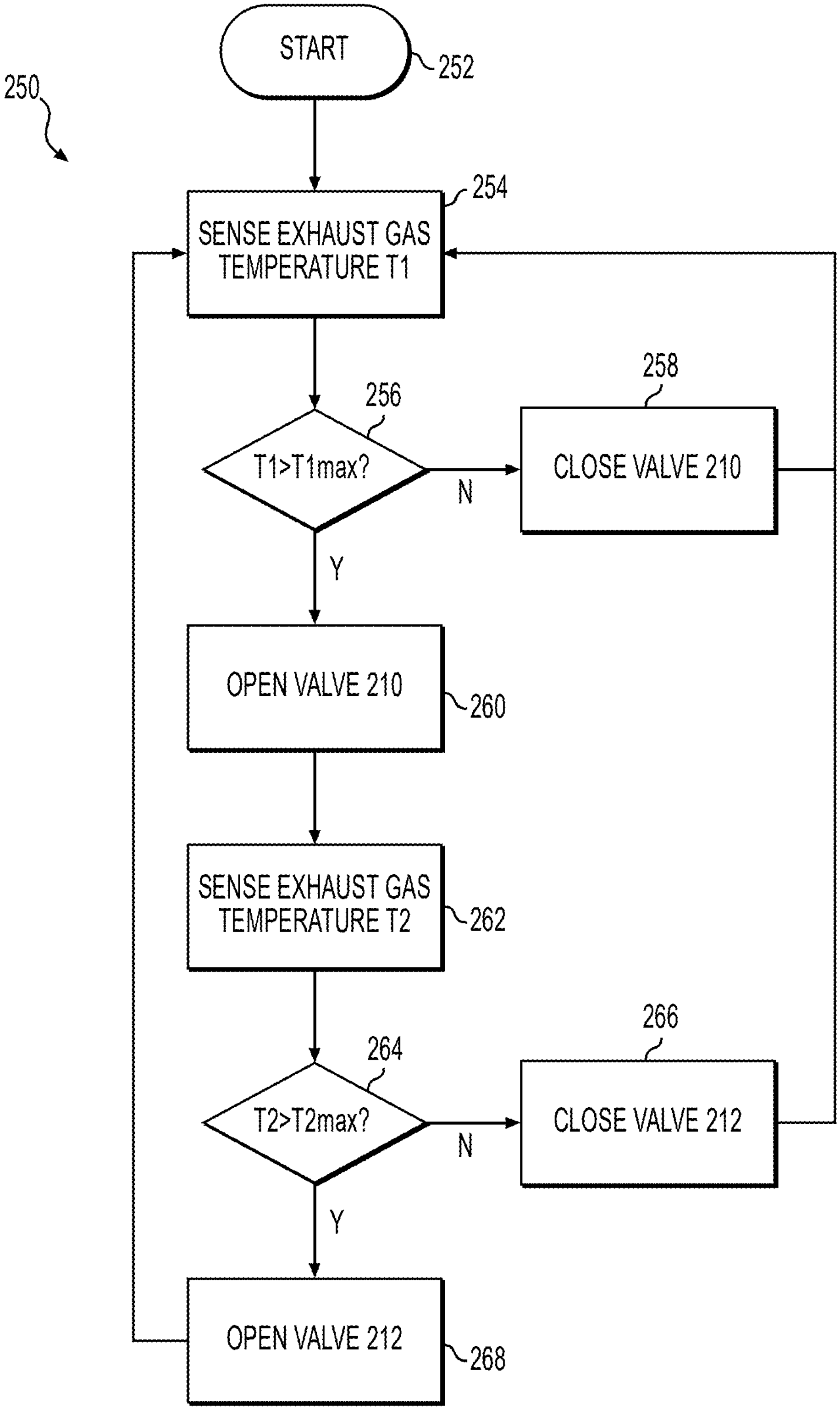
FIG. 8 is a flowchart of a method for controlling the two-stroke engine assemblies of FIGS. 4 to 7.

Turning now to FIG. 8, a method 250 for controlling the two-stroke engine assembly 200 of FIG. 4 will be described. A similar method could be used for controlling the two-stroke engine assemblies 220, 230 and 240, and more specifically for controlling the opening and closing of the valves 210, 212 for preventing the catalytic converters 88, 204 from overheating. It is contemplated that the method 150 described above could be used with the two-stroke engine assemblies 200, 220, 230 and 240 in addition to the method 250.

The method 250 starts at 252 when the ICE 32 is started. Then, at 254, the exhaust gas temperature sensor 90 senses the temperature T1 of the exhaust gases exiting the catalytic converter 88 and sends a signal representative of this temperature to the ECU 100. Then, at 256, the ECU 100 compares the sensed temperature T1 of the exhaust gases to a predetermined temperature T1max. In the present embodiment, the predetermined temperature T1max is the maximum operating temperature of the catalytic converter 88 above which the catalytic converter 88 is too hot and could become damaged or damage the components in proximity to the catalytic converter 88. It is contemplated that the predetermined temperature T1max could be slightly lower than the maximum operating temperature of the catalytic converter 88. In response to the temperature T1 being less than equal to the predetermined temperature T1max at 256, then at 258 the ECU 100 sends a signal to the bypass valve actuator 214 to close the bypass valve 210 if it is not already closed. From 258, the method 250 returns to 254. In response to the temperature T1 being greater than the predetermined temperature T1max at 256, then at 260 the ECU 100 sends a signal to the bypass valve actuator 214 to open the bypass valve 210 if it is not already opened. As described above, when the bypass valve 210 is open, some of the exhaust gas bypasses the catalytic converter 88. As a result, the catalytic converter 88 cools, or at least stops from heating up further.

It is contemplated that, at 256, the ECU 100 could alternatively compare the sensed temperature T1 of the exhaust gases to a minimum operating temperature of the of the catalytic converter 88. In such an embodiment, if the sensed temperature T1 is less than the minimum operating temperature of the catalytic converter 88, then the ECU 100 sends a signal to the bypass valve actuator 214 to slightly open the bypass valve 210. As a result, some of the exhaust gas bypasses the catalytic converter 88 but most of the exhaust gas continues to flow through the catalytic converter 88, but at a slower speed. As a result, the residence time of the exhaust gas in the catalytic converter 88 increases and the catalytic converter 88 heats up. In such an embodiment, if the sensed temperature T1 is greater than or equal to the minimum operating temperature of the catalytic converter 88, then the ECU 100 sends a signal to the bypass valve actuator 214 to close the bypass valve 210 if it is not already closed.

It is also contemplated that, at 256, the ECU 100 could alternatively compare the sensed temperature T1 of the exhaust gases to both the minimum operating temperature of the of the catalytic converter 88 and the predetermined temperature T1max. In such an embodiment, the ECU 100 could send a signal to the bypass valve actuator 214 to slightly open the bypass valve 210 if the sensed temperature T1 is less than the minimum operating temperature of the catalytic converter 88, to fully open the bypass valve 210 if the sensed temperature T1 is more than the predetermined temperature T1max, and to close the bypass valve 210 if the sensed temperature T1 is between or equal to one of the minimum operating temperature of the of the catalytic converter 88 and the predetermined temperature T1max.

From 260, the method 250 proceeds to 262. At 262, the exhaust gas temperature sensor 218 senses the temperature T2 of the exhaust gases exiting the catalytic converter 204 and sends a signal representative of this temperature to the ECU 100. Then, at 264, the ECU 100 compares the sensed temperature T2 of the exhaust gases to a predetermined temperature T2max. In the present embodiment, the predetermined temperature T2max is the maximum operating temperature of the catalytic converter 204 above which the catalytic converter 204 is too hot and could become damaged or damage the components in proximity to the catalytic converter 204. It is contemplated that the predetermined temperature T2max could be slightly lower than the maximum operating temperature of the catalytic converter 204. In response to the temperature T2 being less than equal to the predetermined temperature T2max at 264, then at 266 the ECU 100 sends a signal to the bypass valve actuator 216 to close the bypass valve 212 if it is not already closed. From 266, the method 250 returns to 254. In response to the temperature T2 being greater than the predetermined temperature T2max at 264, then at 268 the ECU 100 sends a signal to the bypass valve actuator 216 to open the bypass valve 212 if it is not already opened. As described above, when the bypass valve 212 is open, some of the exhaust gas bypasses the catalytic converter 204. As a result, the catalytic converter 204 cools, or at least stops from heating up further. From 268, the method 250 returns to 254.

It is contemplated that, at 264, the ECU 100 could alternatively compare the sensed temperature T2 of the exhaust gases to a minimum operating temperature of the of the catalytic converter 204. In such an embodiment, if the sensed temperature T2 is less than the minimum operating temperature of the catalytic converter 204, then the ECU 100 sends a signal to the bypass valve actuator 216 to slightly open the bypass valve 212. As a result, some of the exhaust gas bypasses the catalytic converter 204 but most of the exhaust gas continues to flow through the catalytic converter 204, but at a slower speed. As a result, the residence time of the exhaust gas in the catalytic converter 204 increases and the catalytic converter 204 heats up. In such an embodiment, if the sensed temperature T2 is greater than or equal to the minimum operating temperature of the catalytic converter 204, then the ECU 100 sends a signal to the bypass valve actuator 216 to close the bypass valve 212 if it is not already closed.

It is also contemplated that, at 264, the ECU 100 could alternatively compare the sensed temperature T2 of the exhaust gases to both the minimum operating temperature of the of the catalytic converter 204 and the predetermined temperature T2max. In such an embodiment, the ECU 100 could send a signal to the bypass valve actuator 216 to slightly open the bypass valve 212 if the sensed temperature T2 is less than the minimum operating temperature of the catalytic converter 204, to fully open the bypass valve 212 if the sensed temperature T2 is more than the predetermined temperature T2max, and to close the bypass valve 212 if the sensed temperature T2 is between or equal to one of the minimum operating temperature of the of the catalytic converter 204 and the predetermined temperature T2max.

It is contemplated that from 258, the method could proceed to 262 instead of returning to 254. In embodiments where the bypass passage 208, bypass valve 212 and bypass actuator 216 are omitted, the steps 262, 264, 266 and 268 are omitted, and from 260, the method returns to 254.

Figure 10:
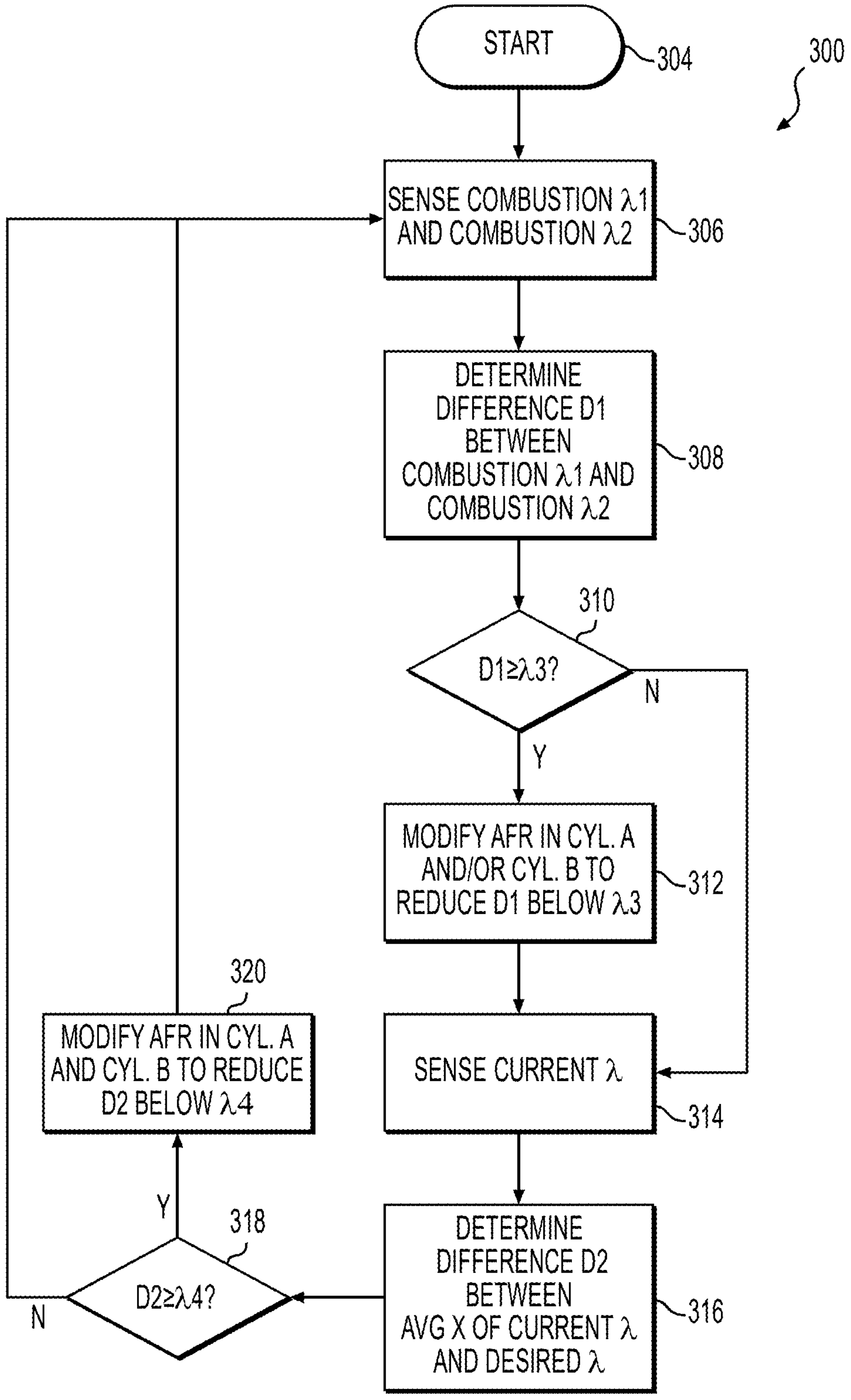
FIG. 10 is a flowchart of another method for controlling the two-stroke engine assembly of FIG. 2.
Figure 11:
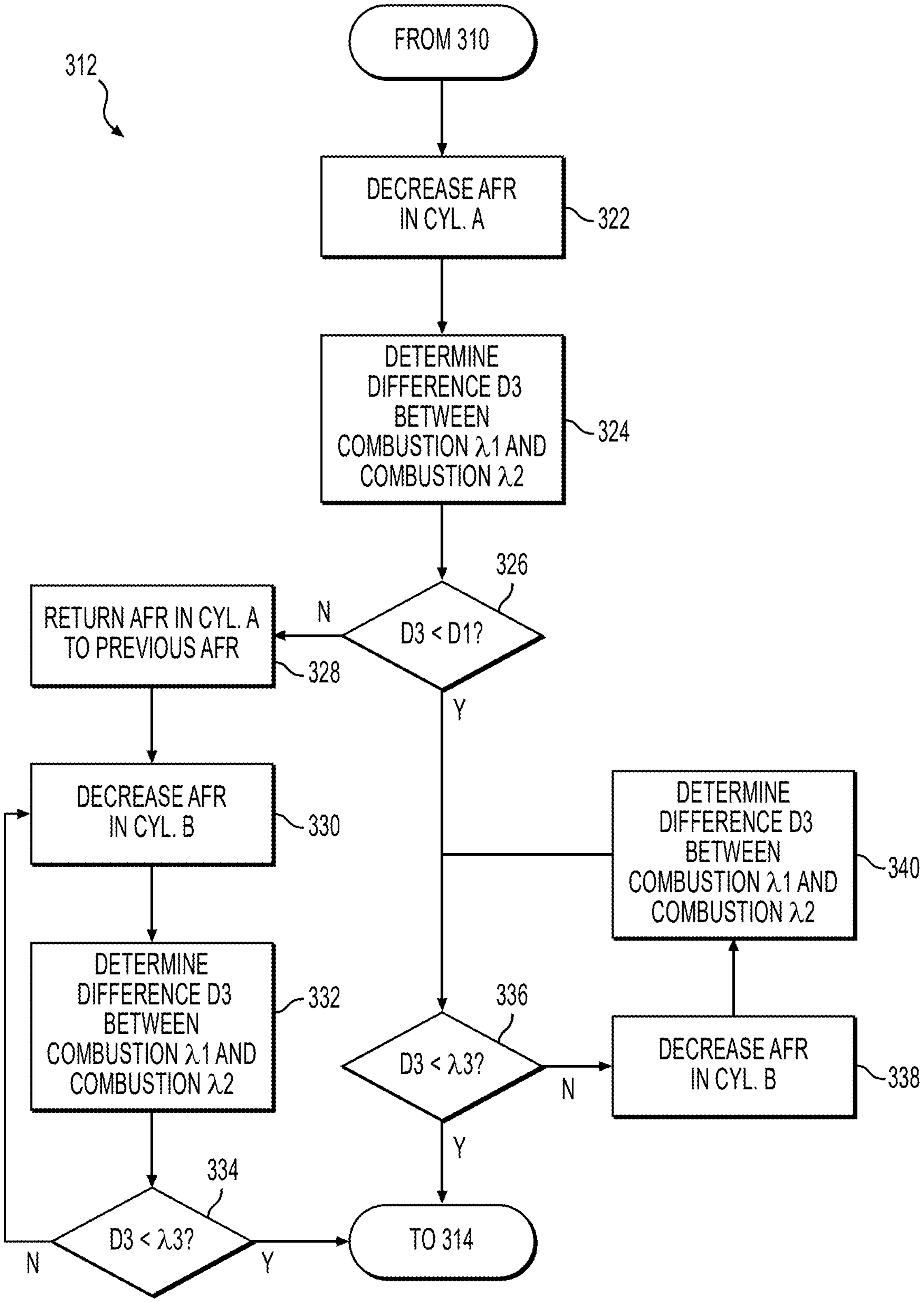
FIG. 11 is a flowchart of a method for performing a step of the method of FIG. 10.

Turning now to FIGS. 10 and 11, a method 300 for controlling the two-stroke engine assembly 50 will be described. As explained in the background section of the present application, although the ICE 32 is being controlled by the ECU 100 for obtaining the stochiometric ratio (or another desired air-fuel ratio depending on the operating conditions) for the catalytic converter 88 to operate efficiently, in reality, the resulting air-fuel ratio could be off for various reasons. In the ICE 32, the air-fuel ratio could be off in one or both cylinders 60. The method 300 described below provides a solution for correcting the air-fuel ratio in the cylinders 60 to obtain the stochiometric ratio (or another desired air-fuel ratio). A similar method could be used for controlling the two-stroke engine assemblies 200, 220, 230 and 240.

Figure 12:
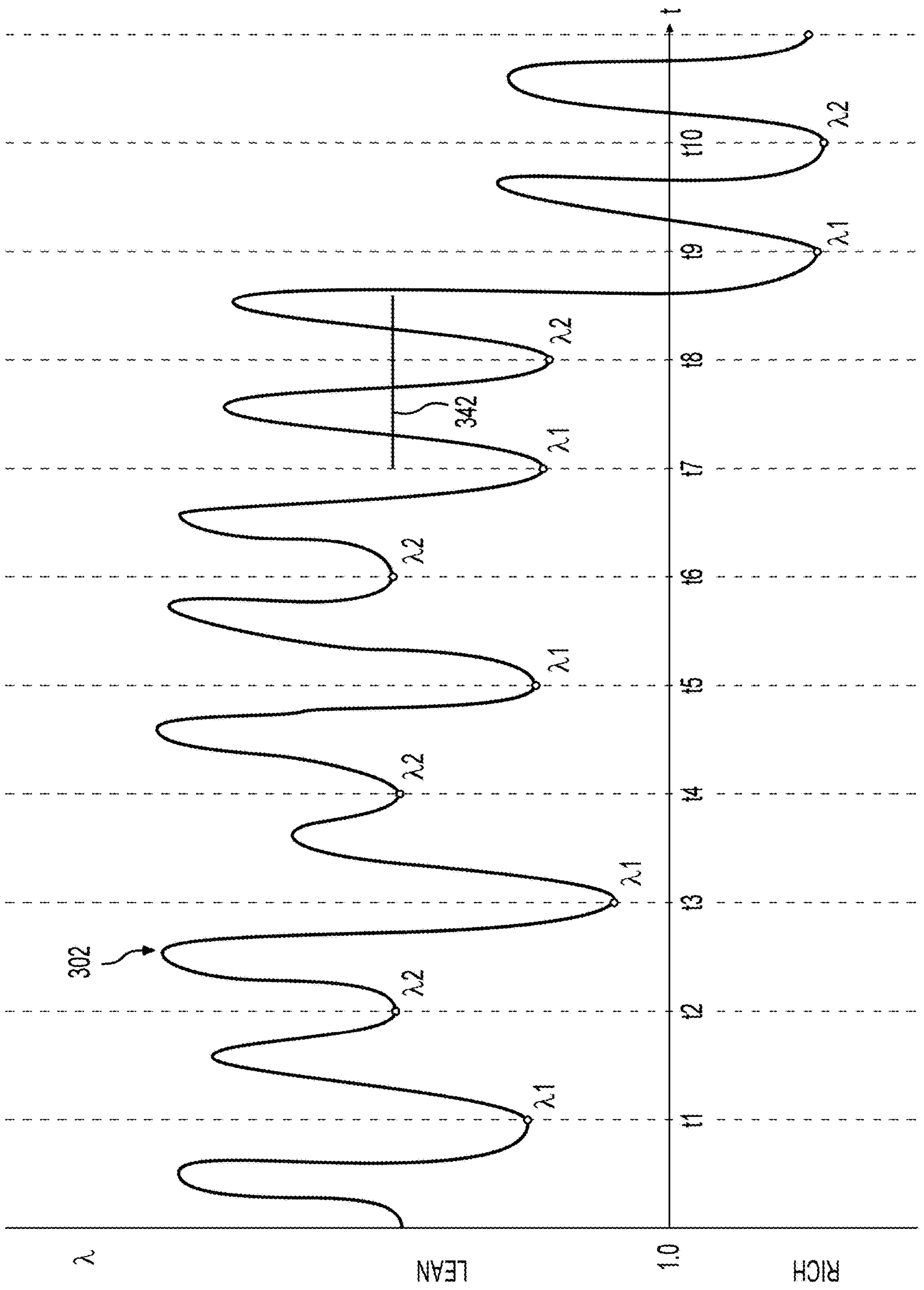
FIG. 12 is a graph of an exemplary signal from a lambda sensor of the two-stroke engine assembly of FIG. 2 resulting from the method of FIG. 10.

The method 300 will be explained using an example of a signal received by the ECU 100 from the lambda sensor 92 illustrated by line 302 in FIG. 12. The line 302 represents the air-fuel equivalence ratio (λ) sensed by the lambda sensor 92 over time. In the example of FIG. 12, for simplicity, the inputs to the ECU 100, other than the signal of from the lambda sensor 92, used for controlling the ICE 32 are considered to be constant to illustrate the effect of the method 300 on the signal from the lambda sensor 92. The valleys λ1 of the line 302 are the λ's sensed by the lambda sensor 92 that correspond to the combustion cycles of one of the cylinders 60, referred to herein as combustion λ1, and the valleys λ2 of the line 302 are the λ's sensed by the lambda sensor 92 that correspond to the combustion cycles of the other one of the cylinders 60, referred to herein as combustion λ2. The peaks of the line 302 immediately following the combustion λ1 and combustion λ2 are λ's sensed by the lambda sensor 92 that correspond to the scavenging cycles of these cylinders 60, referred to herein as scavenging λ's. For example, the peak of the line 302 immediately following one combustion λ1 corresponds to the λ of the scavenging cycle of the cylinder 60 having the combustion λ1. Also, for simplicity, steps of the method 300 have been illustrated in the graph of FIG. 12 as occurring over the time it takes for one combustion λ1, one combustion λ2, and their correspond scavenging λ's to occur. However, it should be understood that each step of the method 300 may take place over multiple combustion λ1's, combustion λ2's, and their correspond scavenging λ's. Also, for the explanation of the method 300, one of the two cylinders 60 will be referred to as cylinder A and the other of the two cylinders 60 will be referred to as cylinder B.

The method 300 starts at 304 when the ICE 32 is started. Then at 306, the lambda sensor 92 senses subsequent combustion λ's of different ones of the cylinders A, B (i.e., combustion λ1 and combustion λ2). More specifically, in the present embodiment, the lambda sensor 92 senses the λ in the exhaust system over a period of time from which combustion λ1 and combustion λ2 can be obtained as corresponding to the valleys of the signal from the lambda sensor 92. In the example of FIG. 12, these are combustion λ1 at time t1 and combustion λ2 at time t2. Then at 308, the ECU 100 determines the difference D1 between the combustion λ1 at time t1 and the combustion λ2 at time t2. Then at 310, the ECU 100 determines if the difference D1 is greater than or equal to a predetermined λ (λ3). If the difference D1 is less than the predetermined λ (λ3), the difference D1 is considered within acceptable tolerances. The value of λ3 will vary depending on the specific construction of the two-stroke engine assembly 50 and depending on what the manufacturer of the two-stroke engine assembly 50 considers acceptable. As such, at 310, in response to the difference D1 being less than λ3, the method proceeds to 314 (described further below) and no correction of the air-fuel ratio in the cylinders A, B is required at this stage.

However, in response to the difference D1 being greater than or equal to λ3 at 310, then at 312 the ECU 100 controls the ICE 32 to modify the air-fuel ratio in one or both of the cylinders A and B to reduce the difference D1 until it is less than λ3. As can be seen in the example of FIG. 12, the combustion λ1 at time t1 is richer than the combustion λ2 at time t2, and for the purposes of this example, the difference D1 between the combustion λ1 at time t1 and the combustion λ2 at time t2 is determined to be greater than λ3 at 310. One contemplated method 312 of modifying the air-fuel ratio in one or both of the cylinders A and B to reduce the difference D1 until it is less than λ3 will be described in detail with reference to FIG. 12, and the results of this method 312 are illustrated from time t3 to time t8 in the example of FIG. 12. Other methods of modifying the air-fuel ratio in one or both of the cylinders A and B to reduce the difference D1 until it is less than λ3 are contemplated. As can be seen in FIG. 12, once the method 312 has been performed, the difference D1 between the combustion λ1 at time t7 and the combustion λ2 at time t8 is very small, and for purposes of this example is now determined to be less than λ3. Following 312, the method proceeds to 314.

At 314, the lambda sensor 92 senses the current λ over a period of time. In the example of FIG. 12, the period of time is from time t7 to the time corresponding to the scavenging λ (i.e., the peak) following combustion λ2 at time t8, but it is contemplated that it could be longer and therefore over more combustion and scavenging cycles of the ICE 32. Then at 316 the ECU 100 determines the difference D2 between the average value X of the current λ of this period of time to a desired λ. The desired λ corresponds to a λ permitting operation of the catalytic converter 88. In the example of FIG. 12, the desired λ is 1.0 (i.e., stochiometric air-fuel ratio), but could be higher or lower depending on the operating conditions of the ICE 32. For example, the desired λ may be rich or lean as a result of the method 150 being carried out. It is contemplated that, in an alternative embodiment, at step 316 instead of comparing the average value X of the whole signal from the lambda sensor 92 to the desired λ, the ECU 100 could compare the average value of the combustion λ's to a desired combustion λ.

Then at 318, the ECU 100 determines if the difference D2 is greater than or equal to a predetermined λ (λ4). If the difference D2 is less than the predetermined λ (λ4), the difference D2 is considered within acceptable tolerances. The value of λ4 will vary depending on the specific construction of the two-stroke engine assembly 50 and depending on what the manufacturer of the two-stroke engine assembly 50 considers acceptable. As such, at 318, in response to the difference D2 being less than λ4, the method returns to 306 and no further correction of the air-fuel ratio in the cylinders A, B is required at this stage. However, in response to the difference D2 being greater than or equal to λ4 at 318, then at 320 the ECU 100 controls the ICE 32 to modify the air-fuel ratio in both of the cylinders A and B to reduce the difference D2 until it is less than λ4. As can be seen in the example of FIG. 12, the average value X of the current λ, illustrated by line 342, is leaner than the desired λ of 1.0, and for the purposes of this example, the difference D2 between the line 342 and the desired λ of 1.0 is determined to be greater than λ4 at 318. As such, at 320, the ECU 100 decreases the air-fuel ratio in both of cylinders A and B until the difference D2 is less than λ4. In the example, this corresponds to the signal from the lambda sensor 92 starting at time t9. If the average value X of the current λ had been richer than the desired λ of 1.0, then at 320 the ECU 100 would have increased the air-fuel ratio in both of cylinders A and B until the difference D2 was less than λ4. From 320, the method returns to 306.

Turning now to FIG. 11, a method for performing step 312 of the method 300 will be described. With reference to the example of FIG. 12, although the ECU 100 can determine that the combustion λ1 at time t1 is richer than the combustion λ2 at time t2, and that therefore the air-fuel ratio of the one of the cylinders A and B having the combustion λ2 should be decreased in order to reduce the difference D1 between the combustion λ1 and the combustion λ2, the ECU 100 does not know which one of the cylinders A and B has the combustion λ1 and which one has the combustion λ2. As such, at step 322 the ECU 100 decreases the air-fuel ratio in cylinder A without knowing if this is the one of the cylinders A, B for which the air-fuel ratio needs to be modified.

Then at 324, the ECU 100 determines the difference D3 between the combustion λ1 and the combustion λ2 resulting from the decrease in air-fuel ratio in cylinder A at 322. Then at 326, the ECU 100 determines if the difference D3 is smaller than the difference D1 determined at 308 (FIG. 10).

If at 326 the difference D3 is greater than the difference D1, it means that cylinder A is not the cylinder in which the air-fuel ratio should have been decreased and that it is the air-fuel ratio in cylinder B that should have been decreased. As such, in response to the difference D3 being greater than the difference D1 at 326, then at 328 the ECU 100 reduces the air-fuel ratio in cylinder A to return it to the air-fuel ratio that was present in cylinder A before decreasing the air-fuel ratio in cylinder A at step 322. Then at 330, the ECU 100 decreases the air-fuel ratio in cylinder B. Then at 332, the ECU 100 determines the difference D3 between the combustion λ1 and the combustion λ2 resulting from the decrease in air-fuel ratio in cylinder B at 330. Then at 334, the ECU 100 determines if the difference D3 determined 332 is less than the predetermined λ (λ3). If the difference D3 determined at 332 is less than λ3, the difference D3 is considered within acceptable tolerances and the method 312 proceeds to 314. However, in response to the difference D3 determined at 332 being greater than or equal to λ3 at 334, then the method 312 returns to 330, and steps 330, 332 and 334 will be performed until D3 determined at 332 is less than λ3. It is contemplated that step 328 could be omitted. It is also contemplated that at step 330, instead of decreasing the air-fuel ratio in cylinder B, the ECU 100 could increase the air-fuel ratio in cylinder A.

If at 326 the difference D3 determined at 324 is less than the difference D1, it means that cylinder A is the one in which the air-fuel ratio is to be decreased. As such, in response to the difference D3 being less than the difference D1 at 326, then at 336, the ECU 100 determines if the difference D3 determined at 332 (or 340, the most recent of the two which has been determined) is less than the predetermined λ (λ3). If the difference D3 determined is less than λ3, the difference D3 is considered within acceptable tolerances and the method 312 proceeds to 314. However, in response to the difference D3 being greater than or equal to λ3 at 336, then at 338 the ECU 100 further reduces the air-fuel ratio in cylinder A. Then at 340, the ECU 100 determines the difference D3 between the combustion λ1 and the combustion λ2 resulting from the decrease in air-fuel ratio in cylinder A at 338. From 340, the method returns to 336. Steps 336, 338 and 340 will be performed until D3 determined at 340 is less than λ3.

It is contemplated that instead of modifying the air-fuel ratio by decreasing the air-fuel ratio at steps 322, 330 and 338, the ECU 100 could modify the air-fuel ratio at steps 322, 330 and 338 by increasing the air-fuel ratio.

Returning to the example of FIG. 12, the results of performing the method 312 will be described. At 322, the air-fuel ratio in cylinder A is decreased. This results in the combustion λ1 at time t3 and the combustion λ2 at time t4. As can be seen, the difference between the combustion λ1 at time t3 and the combustion λ2 at time t4 is now greater than the difference between the combustion λ1 at time t1 and the combustion λ2 at time t2. It is also now known that the combustion λ1 corresponds to the combustion cycle of cylinder A and that the combustion λ2 corresponds to the combustion cycle of cylinder B. Therefore, from 326 the method 312 proceeds to 328 where the air-fuel ratio in cylinder A decreased to return it to the air-fuel ratio present in cylinder A at time t1. This results in the combustion λ1 at time t5 and the combustion λ2 at time t6. Then at 330, the air-fuel ratio in cylinder B is decreased. This results in the combustion λ1 at time t7 and the combustion λ2 at time t8 which are almost equal. As such, at 334 the difference between the combustion λ1 at time t7 and the combustion λ2 at time t8 is considered within acceptable tolerances and the method 312 proceeds to 314. Should the difference between the combustion λ1 at time t7 and the combustion λ2 at time t8 have been more than λ3, then the air-fuel ratio in cylinder B would have been further decreased until the difference between the combustion λ1 and the combustion λ2 is less than λ3. As described above, at 314 the lambda sensor 92 senses the current λ, and at 316 determines the average value X of the current λ. In FIG. 12, the average value X of the current λ, illustrated by line 342, is leaner than the desired λ of 1.0, and for the purposes of this example, the difference D2 between the line 342 and the desired λ of 1.0 is determined to be greater than λ4 at 318. As such, at 320, the ECU 100 decreases the air-fuel ratio in both of cylinders A and B until the difference D2 is less than λ4. This results in the combustion λ1 at time t9 and the combustion λ2 at time t10.

Modifications and improvements to the above-described embodiments of the present invention may become apparent to those skilled in the art. The foregoing description is intended to be exemplary rather than limiting. The scope of the present invention is therefore intended to be limited solely by the appended claims.

What is claimed is:

1. A method for controlling a two-stroke engine assembly, the two-stroke engine assembly comprising a two-stroke internal combustion engine (ICE) having a first cylinder and a second cylinders; and an exhaust system fluidly connected to the ICE, the exhaust system comprising a tuned pipe and a catalytic converter; the method comprising:

- sensing in the exhaust system, with a lambda sensor, a first combustion air-fuel equivalence ratio and a second combustion equivalence ratio, the first combustion equivalence ratio and the second combustion equivalence ratio being subsequent combustion equivalence ratios of different ones of the first cylinder and the second cylinders;
- determining, by an engine control unit (ECU), a difference between the first combustion equivalence ratio and the second combustion equivalence ratio; and
- in response to the difference between the first combustion equivalence ratio and the second combustion equivalence ratio being greater than a predetermined equivalence ratio, modifying an air-fuel ratio in at least one of the first cylinder and the second cylinders to reduce the difference between the first combustion equivalence ratio and the second combustion equivalence ratio below the predetermined equivalence ratio.

2. The method of claim 1, wherein:

- the predetermined equivalence ratio is a first predetermined equivalence ratio; and
- in response to the difference between the first combustion equivalence ratio and the second combustion equivalence ratio being less than the first predetermined equivalence ratio:
  - sensing with the lambda sensor a current equivalence ratio in the exhaust system over a first period of time;
  - determining, by the ECU, a difference between an average value X of the current equivalence ratio over the first period of time to a desired equivalence ratio; and
  - in response to the difference between the average value X and the desired equivalence ratio being greater than a second predetermined equivalence ratio, modifying the air-fuel ratio in both of the first cylinder and the second cylinders to reduce the difference between the average value X and the desired equivalence ratio.

3. The method of claim 2, wherein the desired equivalence ratio corresponds to a equivalence ratio for operating the catalytic converter of the exhaust system.

4. The method of claim 1, wherein modifying the air-fuel ratio in at least one of the first cylinder and the second cylinders to reduce the difference between the first combustion equivalence ratio and the second combustion equivalence ratio below the predetermined equivalence ratio comprises:

- modifying the air-fuel ratio in the first cylinder;
- sensing with the lambda sensor the first combustion equivalence ratio and the second combustion equivalence ratio after modifying the air-fuel ratio in the first cylinder;
- determining, by the ECU, the difference between the first combustion equivalence ratio and the second combustion equivalence ratio after modifying the air-fuel ratio in the first cylinder;
- in response to the difference between the first combustion equivalence ratio and the second combustion equivalence ratio after modifying the air-fuel ratio in the first cylinder being less than the difference between the first combustion equivalence ratio and the second combustion equivalence ratio prior to modifying the air-fuel ratio in the first cylinder:
  - further modifying the air-fuel ratio in the first cylinder until the difference, determined by the ECU, between the first combustion equivalence ratio and the second combustion equivalence ratio sensed by the lambda sensor is less than the predetermined equivalence ratio; and
- in response to the difference between the first combustion equivalence ratio and the second combustion equivalence ratio after modifying the air-fuel ratio in the first cylinder being greater than the difference between the first combustion equivalence ratio and the second combustion equivalence ratio prior to modifying the air-fuel ratio in the first cylinder:
  - modifying the air-fuel ratio in the second cylinder until the difference, determined by the ECU, between the first combustion equivalence ratio and the second combustion equivalence ratio sensed by the lambda sensor is less than the predetermined equivalence ratio.

5. The method of claim 4, wherein:

- modifying the air-fuel ratio in the first cylinder comprises decreasing the air-fuel ratio in the first cylinder; and
- modifying the air-fuel ratio in the second cylinder comprises decreasing the air-fuel ratio in the second cylinder.

6. The method of claim 4, wherein in response to the difference between the first combustion equivalence ratio and the second combustion equivalence ratio after modifying the air-fuel ratio in the first cylinder being greater than the difference between the first combustion equivalence ratio and the second combustion equivalence ratio prior to modifying the air-fuel ratio in the first cylinder:

- further modifying the air-fuel ratio in the first cylinder to obtain an air-fuel ratio in the first cylinder corresponding to an air-fuel ratio present in the first cylinder prior to modifying the air-fuel ratio in the first cylinder.

* * * * *